United States Patent
Chandra et al.

(10) Patent No.: US 12,349,039 B2
(45) Date of Patent: Jul. 1, 2025

(54) ULTRA-RELIABLE AND LOW-LATENCY COMMUNICATION USING STATELESS AND OFFLINE DICTIONARY COMPRESSION

(71) Applicant: Cisco Technology, Inc., San Jose, CA (US)

(72) Inventors: Rupak Chandra, Fremont, CA (US); Alessandro Erta, Licciana Nardi (IT)

(73) Assignee: Cisco Technology, Inc., San Jose, CA (US)

( * ) Notice: Subject to any disclaimer, the term of this patent is extended or adjusted under 35 U.S.C. 154(b) by 654 days.

(21) Appl. No.: 17/742,038

(22) Filed: May 11, 2022

(65) Prior Publication Data
US 2023/0370941 A1    Nov. 16, 2023

(51) Int. Cl.
*H04W 40/12*    (2009.01)
(52) U.S. Cl.
CPC .................................... *H04W 40/12* (2013.01)
(58) Field of Classification Search
CPC .................................................... H04W 40/12
USPC ......................................................... 370/328
See application file for complete search history.

(56) References Cited

U.S. PATENT DOCUMENTS

| 8,665,904 | B2 | 3/2014 | Bokish et al. |
| 10,277,716 | B2 | 4/2019 | Bhaskar et al. |
| 2006/0235992 | A1* | 10/2006 | Matias ............... H04L 65/1101 709/236 |
| 2011/0202673 | A1 | 8/2011 | Vadlakonda et al. |
| 2019/0313281 | A1* | 10/2019 | Bencheikh ............ H04W 28/06 |
| 2021/0144584 | A1 | 5/2021 | Chandra et al. |
| 2021/0314815 | A1 | 10/2021 | Gangakhedkar et al. |
| 2022/0287125 | A1* | 9/2022 | Bathwal ................ H04L 1/0014 |

FOREIGN PATENT DOCUMENTS

WO    2015158389    10/2015

OTHER PUBLICATIONS

"Difference between stateless and stateful compression?", online: https://stackoverflow.com/questions/3994244/difference-between-stateless-and-stateful-compression, accessed May 4, 2022, 2 pagers.
Larsson, et al., "Online Dictionary-Based Compression", 2008 International Conference on Computer Science and Information Technology, Sep. 2008, 10 pages, IEEE, Singapore.

* cited by examiner

*Primary Examiner* — Faisal Choudhury
(74) *Attorney, Agent, or Firm* — BEHMKE INNOVATION GROUP LLC; James M. Behmke (57) ABSTRACT

In one embodiment, a mobile node having a first radio and a second radio applies stateless offline dictionary compression to an uncompressed stream of packets, to form a compressed stream of packets. The first radio of the mobile node communicates with a first access point of a wireless network and the second radio of the mobile node communicates with a second access point of the wireless network. The mobile node selects the first radio to send the uncompressed stream of packets and the second radio to send the compressed stream of packets. The mobile node sends, via the first radio, the uncompressed stream of packets to the first access point over a first wireless path. The mobile node sends, via the second radio, the compressed stream of packets to the second access point over a second wireless path.

20 Claims, 6 Drawing Sheets

ULTRA-RELIABLE AND LOW-LATENCY COMMUNICATION USING STATELESS AND OFFLINE DICTIONARY COMPRESSION

TECHNICAL FIELD

The present disclosure relates generally to computer networks, and, more particularly, to ultra-reliable and low-latency communication using stateless and offline dictionary compression.

BACKGROUND

As wireless access points become increasingly ubiquitous, more and more access points are being deployed in non-traditional settings, such as industrial and transportation settings. For instance, some mines now rely on wireless network deployments to monitor the mining process and the fleet of vehicles moving throughout a mine. This allows the operator of the mine to quickly identify problems, such as a broken down truck or other issues that may arise. Similarly, factory and warehouse operators are increasingly relying on wireless networks to control their devices, such as mobile robots, sensors and actuators, and the like.

In contrast to wireless networks deployed to traditional locations (e.g., office buildings, schools, etc.), non-traditional wireless network deployments may be subject to various conditions that can affect the radio frequency (RF) signals in the area. For instance, the high presence of metal in a mine could lead to severe signal degradation and blockage. In addition, nodes in these networks (e.g., trucks, trains, etc.) may be highly dynamic as they move throughout the area. This can also lead to signal fading and congestion due to interference. In extreme cases, the environmental factors can impinge on the wireless communications to such a degree that the controlled process is interrupted. Indeed, if a controlled node is unable to communicate with the wireless network, that node will be unable to receive control commands or report data back to its supervisory service.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a mobile node having a first radio and a second radio applies stateless offline dictionary compression to an uncompressed stream of packets, to form a compressed stream of packets. The first radio of the mobile node communicates with a first access point of a wireless network and the second radio of the mobile node communicates with a second access point of the wireless network. The mobile node selects the first radio to send the uncompressed stream of packets and the second radio to send the compressed stream of packets. The mobile node sends, via the first radio, the uncompressed stream of packets to the first access point over a first wireless path. The mobile node sends, via the second radio, the compressed stream of packets to the second access point over a second wireless path.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
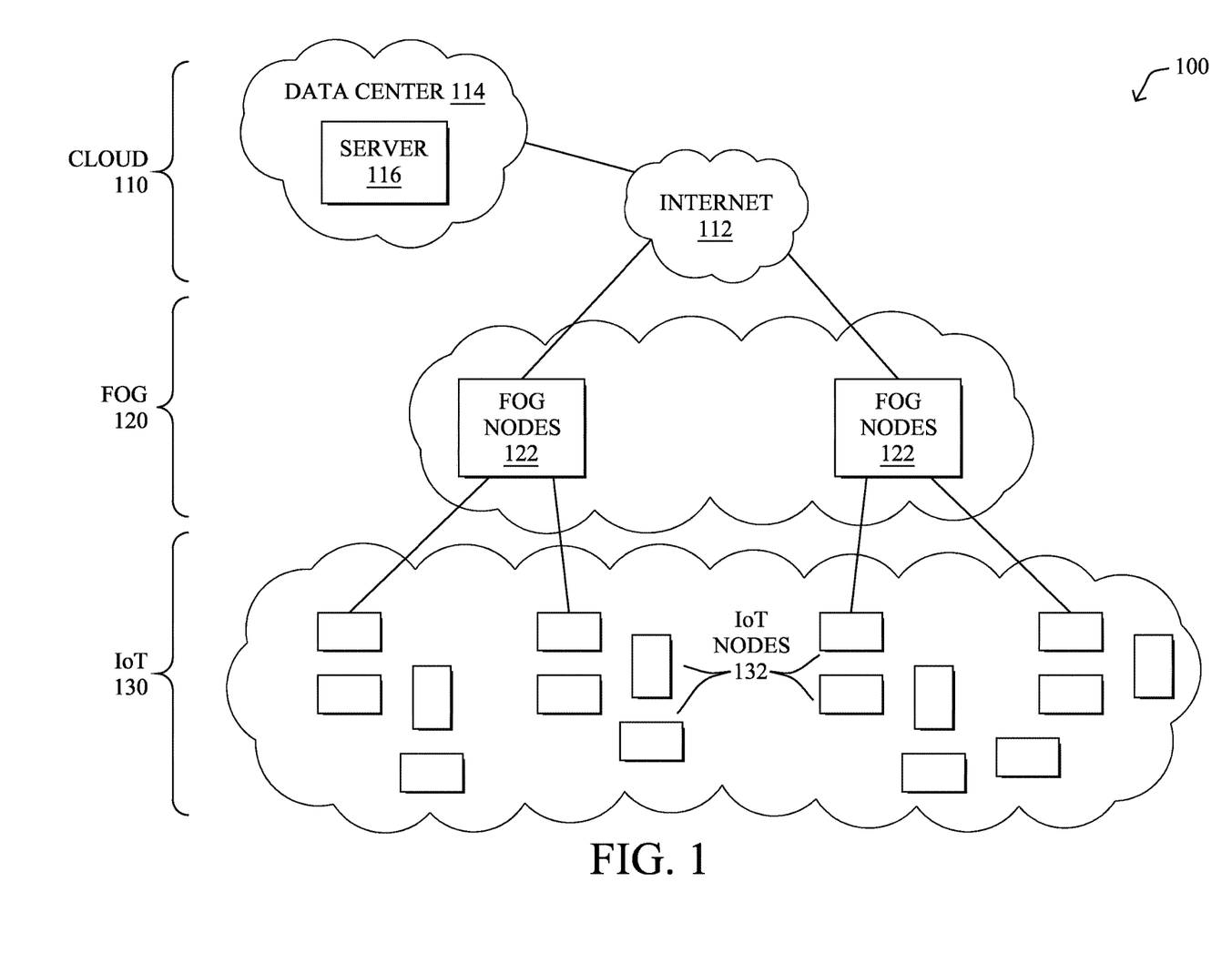
FIG. 1 illustrate an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely a cloud layer 110, a fog layer 120, and an IoT device layer 130. Illustratively, cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
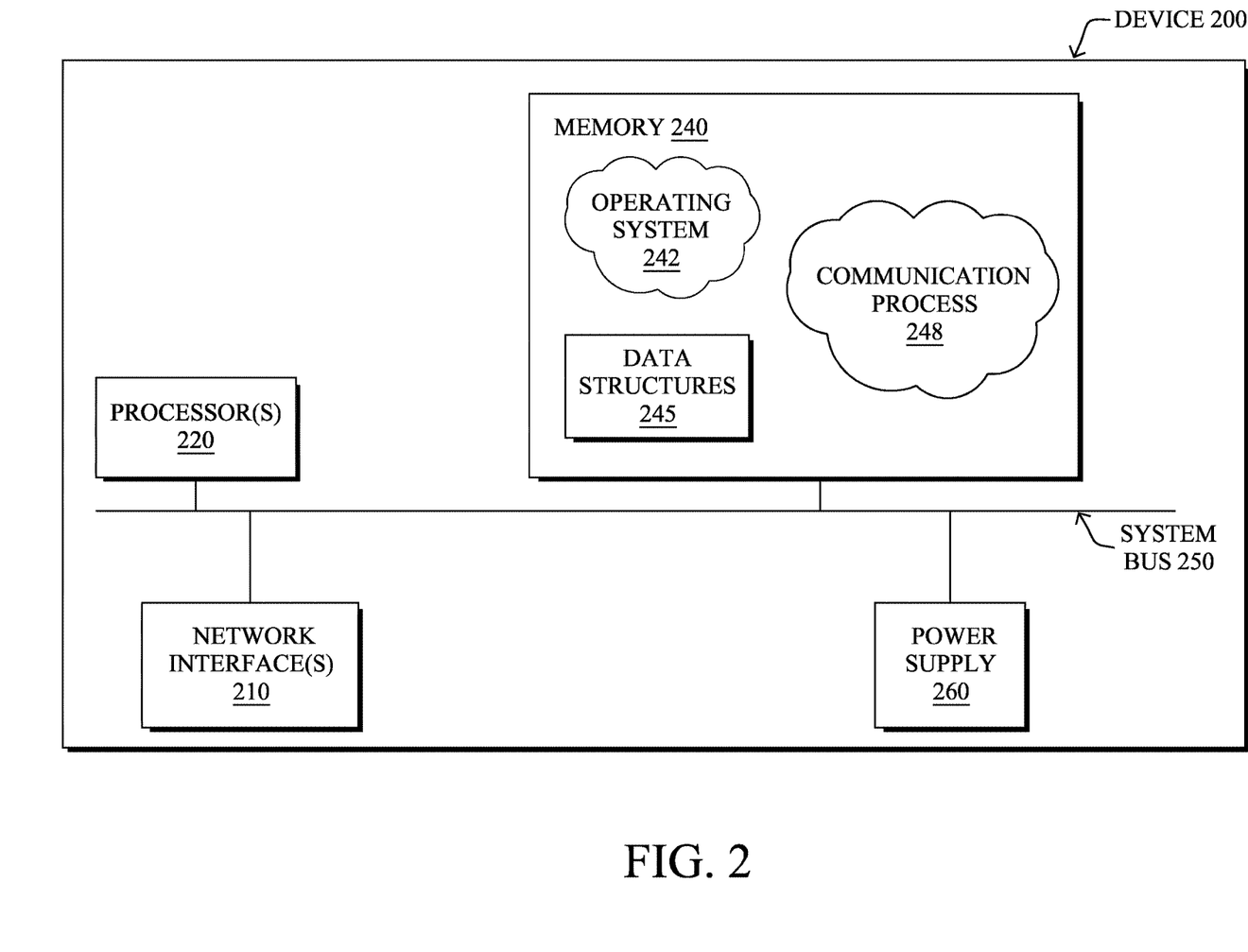
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein. Note that while communication process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
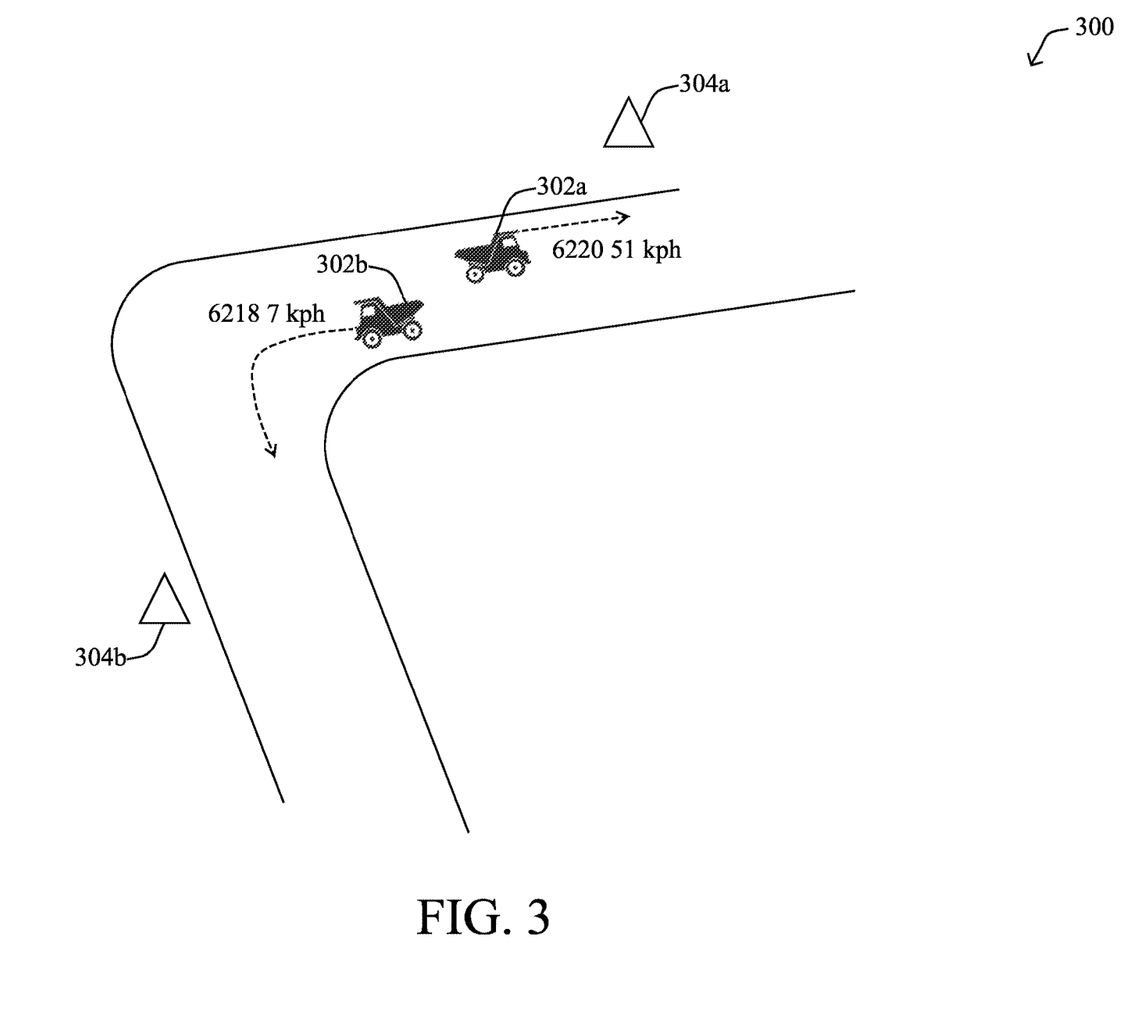
FIG. 3 illustrates an example industrial wireless network deployed in a mine.

As noted above, many IoT networks are implemented as wireless meshes. For instance, FIG. 3 illustrates an example industrial network 300. As shown, a number of vehicles 302a-302b may be deployed to the location of industrial network 300. For example, if the deployment location of industrial network 300 is a mine, vehicles 302a-302b may be autonomous trucks or carts. Each of vehicles 302a-302b may include its own hardwired network, such as a Controller Area Network (CAN) Bus, Ethernet, or the like, that allow the various components of the vehicle to communicate with one another. For example, a plurality of sensors on vehicle 302a may send sensor readings to an onboard navigation system that controls the steering and acceleration of vehicle 302a within the deployment location of wireless network 300 via a local, hardwired network of vehicle 302a.

Distributed throughout the deployment location of wireless network 300 may be any number of wireless access points 304, such as wireless access points 304a-304b, that form a wireless mesh network. In some embodiments, the access points 304 may be autonomous access points that self-organize into a wireless mesh. For example, certain access points 304 may function as mesh access points (MAPs) and arrange themselves into a wireless mesh rooted at a root access point (RAP). In alternative deployments, access points 304a-304b may be connected to one another, and/or a supervisory device, via a hardwired network backend.

Preferably, each of the mobile nodes in wireless network 300, such as vehicles 302a-302b, may include a plurality of radios/transceivers. This allows a particular vehicle 302 to attach/associate to a particular access point 304 using a first one of its radios/transceivers over a certain wireless channel (e.g., form a link with that access point). In addition, the additional radio(s) of the vehicle 302 may also form links with the same access point 304 on a different channel and/or with one or more other access points 304. For instance, as shown, vehicle 302b may communicate with access point 304a using a first radio and may also communicate with access point 304b using a different radio. Doing so affords vehicle 302b multiple communication paths to the backend infrastructure through the use of spatially diverse access points 304.

The process by which a vehicle 302 detaches from an access point 304 and attaches to a different access point 304 is known as roaming. This process may be repeated any number of times, as a vehicle 302 moves throughout the area. Typically, the decision to roam from the current access point 304 being used by a vehicle 302 to another access point 304 is made by comparing the radio signal quality metrics for the access points to one or more roaming thresholds. Notably, if the received signal strength indicator (RSSI), signal-to-noise (SNR) ratio, or the like, crosses the roaming threshold, the vehicle 302 may roam to another access point 304. For example, as vehicle 302b moves away from access point 304a, its measured RSSI with access point 304a may drop below the defined roaming threshold, leading vehicle 302b to roam to another access point 304, such as access point 304b.

Figure 4:
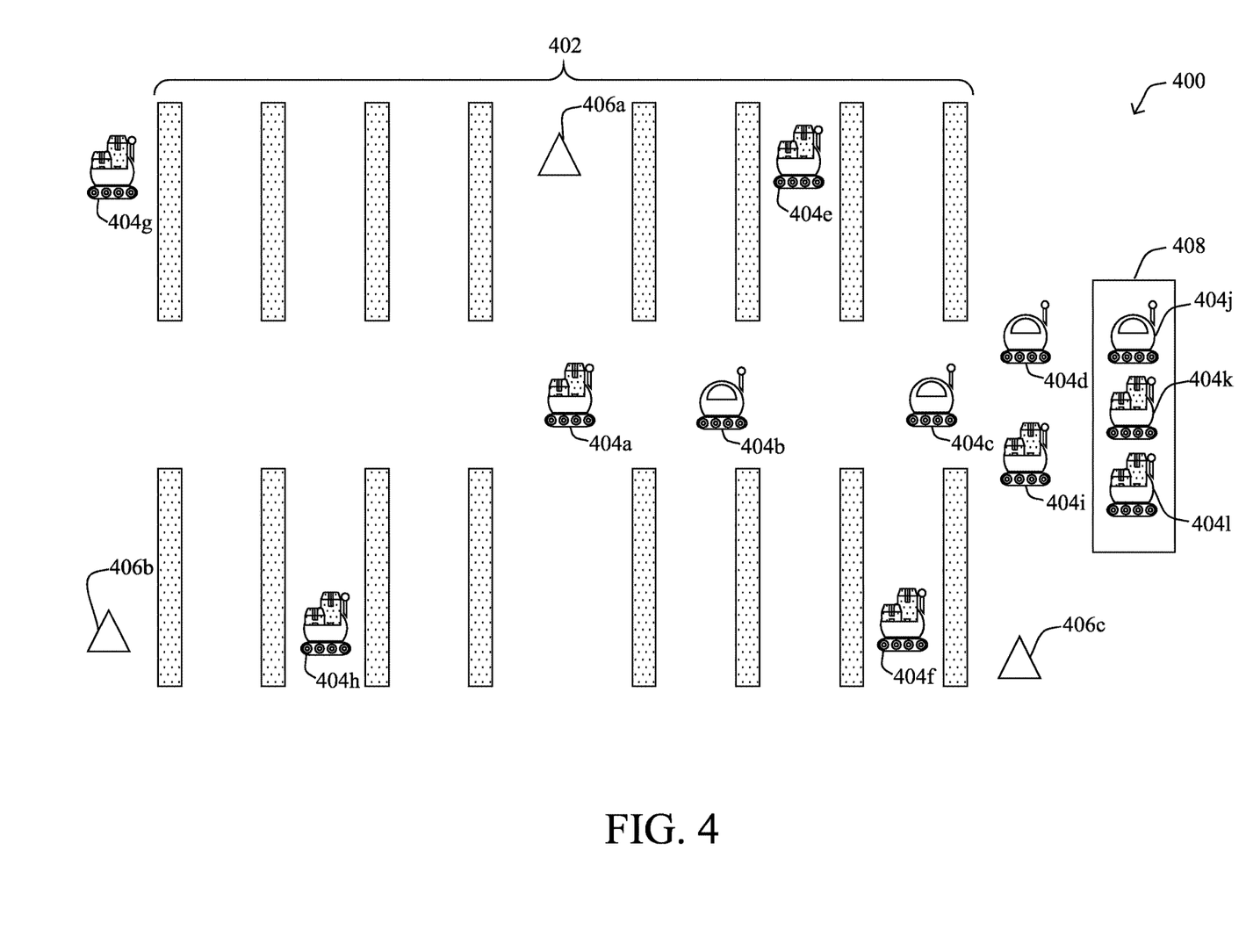
FIG. 4 illustrates an example industrial wireless network deployed in a warehouse.

FIG. 4 illustrates another example of an industrial wireless network deployed in a warehouse 400, in various embodiments. As shown, assume that a plurality of inventory racks 402 are distributed throughout warehouse 400 and located for purposes of storing items. As would be appreciated, inventory racks 402 are optional and other forms of storage systems may be deployed throughout warehouse 400, in other cases. For instance, warehouse 400 may also include containers, holding pens, or the like, in which various items may be stored.

To aid in the storage and/or retrieval of the items in the warehouse, any number of mobile robots 404 may be deployed, such as mobile robots 402a-404l shown. In general, each mobile robot 404 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. In some embodiments, mobile robots 404 may also include mechanisms to automatically load and/or unload items, such as forklifts, mechanical claws, or the like. In other embodiments, mobile robots 404 may require the assistance of human workers to load and unload items to and from them, such as at a pack-out area 408.

In some instances, mobile robots 404 may be partially or fully autonomous, allowing them to complete their tasks, independently. For instance, a particular mobile robot 404 may be sent a task list that indicates the set of items that the robot is to retrieve from within warehouse 400, navigation information if so needed, or any other information that may be required for the performance of its retrieval functions. To this end, warehouse 400 may also include a wireless network that comprises access points 406, such as access points 406a-406c.

Similar to the example in FIG. 3, each mobile robot 404 in FIG. 4 may include a plurality of radios/transceivers, thereby allowing them to communicate with multiple access points 406 (or different radios of the same access point). This allows a given mobile robot 404 to leverage multiple communication paths with the backend infrastructure.

As noted above, non-traditional deployment locations for wireless networks, such as in the examples of FIGS. 3-4, typically experience conditions that are not present in more traditional locations, such as office buildings, schools, etc. Indeed, non-traditional wireless network deployments may be subject to various conditions that can affect the radio frequency (RF) signals in the area. For instance, the high presence of metal in a mine could lead to severe signal degradation and blockage. In addition, nodes in these networks (e.g., trucks, trains, etc.) may be highly dynamic as they move throughout the area. This can also lead to signal fading and congestion due to interference. In extreme cases, the environmental factors can impinge on the wireless communications to such a degree that the controlled process is interrupted. Indeed, if a controlled node is unable to communicate with the wireless network, that node will be unable to receive control commands or report data back to its supervisory service.

Of course, the non-traditional environments in FIGS. 3-4 are exemplary only and the techniques introduced herein may be applied to any number of other forms of network deployments. For instance, the techniques herein may be used within other non-traditional deployment locations, such as railways, roadways, runways, factories, and the like, where RF conditions may compromise the reliability of the network, as well as in traditional deployment locations, as desired.

In addition, when utilizing multiple radios to provide ultra-reliable wireless communications to a mobile node, another observation can also be made: the duplication of packets over multiple paths for increased diversity also has the effect of increasing the airtime utilization. Indeed, this increase will be by a factor of N, where N is the number of different paths (and radios of the mobile node) that are used. With many such mobile nodes in the area, this may greatly increase the potential for collisions between wireless communications.

Ultra-Reliable and Low-Latency Communication Using Stateless and Offline Dictionary Compression The techniques introduced can help to reduce wireless collisions in networks in which mobile nodes leverage path diversity for ultra-reliable communications. In some aspects, stateless and offline dictionary compression may be used on at least a portion of the traffic streams sent to and/or from a mobile node over different wireless paths. In further aspects, a tradeoff is made between compressing and not compressing the streams, as compressing a stream reduces the airtime needed to send that stream, but at the cost of increasing latency (e.g., due to the additional processing needed to compress the stream).

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Specifically, according to various embodiments, a mobile node having a first radio and a second radio applies stateless offline dictionary compression to an uncompressed stream of packets, to form a compressed stream of packets. The first radio of the mobile node communicates with a first access point of a wireless network and the second radio of the mobile node communicates with a second access point of the wireless network. The mobile node selects the first radio to send the uncompressed stream of packets and the second radio to send the compressed stream of packets. The mobile node sends, via the first radio, the uncompressed stream of packets to the first access point over a first wireless path. The mobile node sends, via the second radio, the compressed stream of packets to the second access point over a second wireless path.

Figure 5:
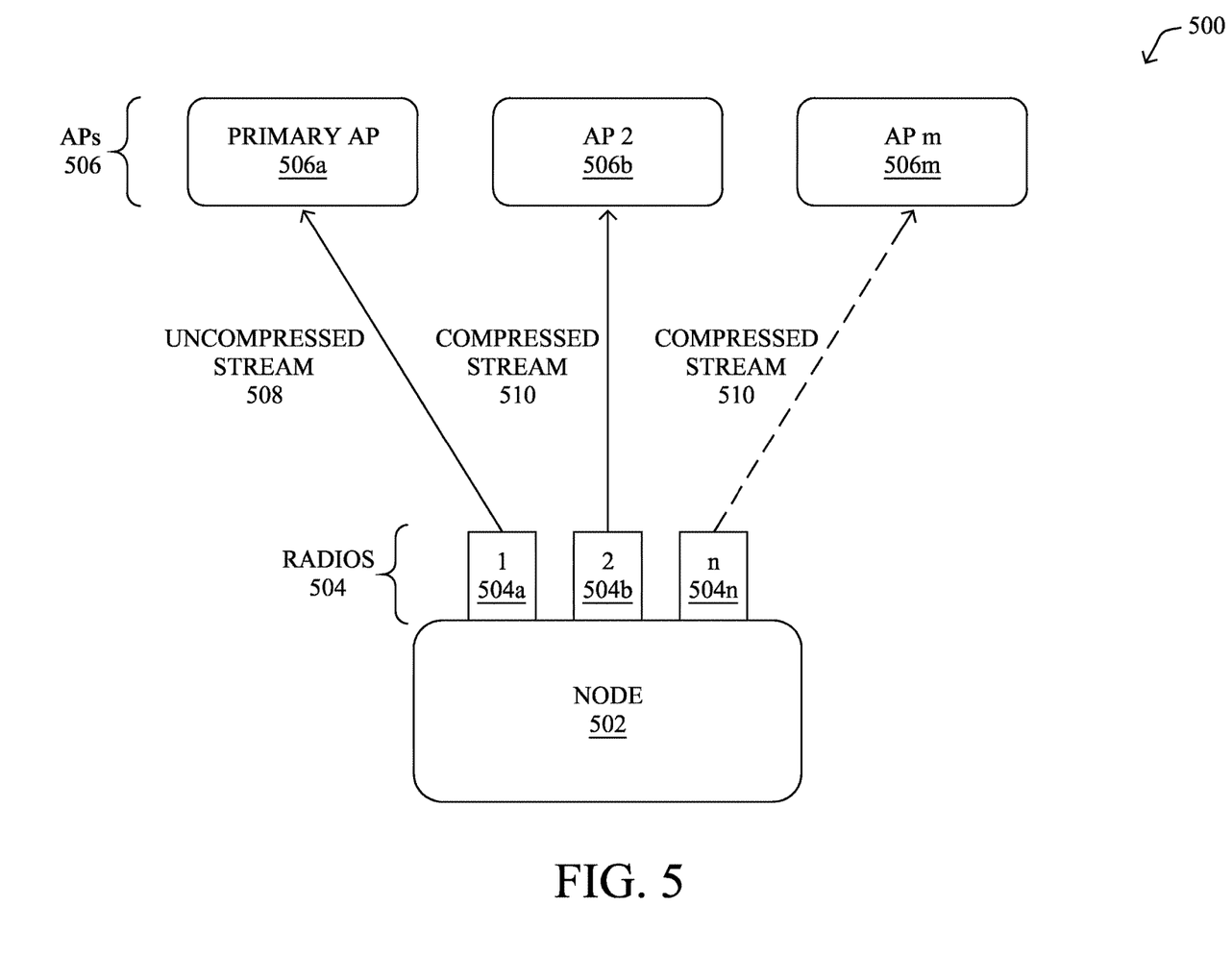
FIG. 5 illustrates an example of using stateless and offline dictionary compression in a wireless network.

Operationally, FIG. 5 illustrates an example of using stateless and offline dictionary compression in a wireless network 500, according to various embodiments. As shown, assume that there is a node 502, such as one of the mobile nodes shown in FIG. 3-4 or any other node/client of wireless network 500, that comprises a plurality of radios 504 (e.g., a $1^{st}$ through $n^{th}$ radio). In addition, assume that the infrastructure of wireless network 500 includes access points (APs) 506 (e.g., a $1^{st}$ through $m^{th}$ AP). Depending on the location of node 502, its movement (if any), and the locations of APs 506, node 502 may be within communication range of any or all of APs 506 shown.

For purposes of illustration of the techniques herein, assume that a first radio 504a within radios 504 of node 502 is wirelessly connected to a first/primary AP 506a within APs 506. Typically, this association may be made in part based on the RSSI, SNR, or other RF characteristics measured between radio 504a and AP 506a. For instance, AP 506a may periodically send out beacons that announce its presence to any nodes within range. In turn, a receiving node, such as node 502, may assess the RF or other characteristics of that beacon and respond with an association request, to associate radio 504a with AP 506a.

Now, assume that there is a stream of data packets that node 502 is to send. Were node 502 to send the stream of data packets in uncompressed form via each of the wireless paths available to it (e.g., via first path between radio 504a and AP 506a, via a second path between radio 504b and AP 506b, etc., through an $n^{th}$ path between radio 504n and AP 506m), the airtime needed for these transmissions is at a maximum. This can lead to interference, especially if other such nodes 502 are also in the area and communicating at the same time.

A key observation herein is that compression can be applied to the stream of packets, which will reduce the amount of data to be sent. Consequently, the airtime needed to send the stream will also be reduced, leading to fewer collisions. However, compressing the stream of packets is not without cost. Indeed, compressing the stream of packets will also increase the overall communication latency, since compressing and decompressing the stream of packets will take a non-negligible amount of time to perform. For critical traffic, such as control traffic, this additional latency may impinge on the operation of node 502 and/or the wireless network 500, itself, or otherwise be undesirable.

According to various embodiments, the techniques herein support the use of a hybrid approach whereby a stream of packets may be sent in uncompressed form over at least one of the wireless paths available to node 502, benefitting from the reduced latency that this affords, while a compressed form of the stream may also be sent over at least one of the other wireless paths available to node 502. For instance, as shown, node 502 may send the uncompressed stream 508 via radio 504a over a first wireless path to AP 506a, while also sending the compressed stream 510 with the same data via any or all of its other radios 504b-504n and the other wireless paths also available to it. By doing so, this ensures that the stream will be sent in a low-latency manner towards AP 506a. However, if there are any communication problems with AP 506a, also sending compressed stream 510 via one or more other wireless paths can also help to ensure reliability, as the stream of packets may still arrive at its destination, albeit with increased latency. In some embodiments, node 502 may also begin sending uncompressed stream 508 as soon as possible, meaning that it may start sending uncompressed stream 508 slightly sooner than that of compressed stream 510.

In turn, compressed stream 510 may be decompressed by the infrastructure itself or by the destination using a corresponding decompression mechanism. In addition, the infrastructure or the destination may also employ a packet elimination mechanism to eliminate duplicate copies of any packets received via different paths. For instance, if AP 506a successfully receives a particular packet of uncompressed stream 508, the corresponding packet in compressed stream 510 can then be ignored or otherwise eliminated.

Note that while the example shown in FIG. 5 relates to node 502 sending a stream of packets, the techniques herein are equally applicable to a stream of packets that may be sent to node 502 over the various wireless paths, as well. More specifically, the same stream of packets destined for node 502 may be sent by APs 506 such that an uncompressed version of the stream is sent over at least one wireless path and a compressed version of the stream is sent over one or more other wireless paths.

Preferably, and in various embodiments, compressed stream 510 may be formed by node 502 by applying a stateless, offline dictionary-based compression scheme to the packets of uncompressed stream 508. In general, stateless compression schemes differ from stateful schemes in that they do not rely on a prior history of the data. This is particularly useful as it allows for the instantaneous recovery from intermittent packet loss, without the need for packet retries, thereby keeping a low latency profile.

In addition, the techniques herein also propose that an offline dictionary be used for the compression of uncompressed stream 508 into compressed stream 510. As would be appreciated, offline dictionaries differ from online dictionaries that are generated on the fly based on the data currently being compressed. Offline dictionary-based approaches are particularly suitable for IoT applications in that they provide high compaction ratios for communications involving small, repetitive, and (previously) uncompressed payloads. In addition, dictionary-based encoding and decoding processes are also comparatively fast operations, resulting in lower latency.

Example compression mechanisms that could be used may include, but are not limited to, compression mechanisms based on Lempel-Ziv compression (e.g., LZ77 or LZ78 compression schemes), Huffman coding-based approaches, or the like. Of course, while stateless, offline dictionary-based approaches are preferred, other compression schemes could also be used, in further embodiments, such as stateful compression, online dictionary-based compression, or the like.

According to various embodiments, various factors may be used to control when and how a particular stream of packets is compressed and sent over alternate wireless paths. Thus, the techniques herein may also be performed dynamically, based these factors. In various embodiments, such factors may include, but are not limited to, any or all of the following:

The specific path available for use-Here, node 502 may opt to send uncompressed stream 508 over a 'good' path that offers a higher data rate and compressed stream 510 over a 'bad' path that offers a lower data rate. For instance, node 502 may select the path to AP 506a for uncompressed stream 508 and the path to AP 506b for compressed stream 510, if the former offers a better data rate than that of the latter. This can further help to ensure that the traffic is sent with the lowest latency available.

Expected performances of the paths—In some cases, such as when node 502 traverses a regular route or is repeatedly in the same location, the performances of the wireless paths available to it may also be taken into consideration. For instance, node 502 may rely on the expected data rates for the different paths, based on their prior performances, even if the current performance metrics for the paths are not known.

The type of traffic to be sent-Here, node 502 may take into account the nature of the traffic, such as whether the traffic is considered critical (e.g., control traffic) versus non-critical (e.g., audio data, video data, etc.). For instance, low-latency may be more important for critical traffic and, in such a case, node 502 may decide to send uncompressed stream 508 via multiple wireless paths, instead of just the wireless path to AP 506a (e.g., in addition to sending compressed stream 510 over at least one other path).

The specific application associated with the traffic—In addition, node 502 may also take into account the specific application that is sending the packets of the stream. Such information may be garnered, for instance, through explicit packet marking, packet inspection, or the like.

Etc.

In other words, based on any or all of the factors above, node 502 may vary its compression and/or sending strategies, in a dynamic manner. In some embodiments, node 502 may even opt to send a particular stream of packets via multiple wireless paths only in compressed form or in uncompressed form. In addition, the number of wireless paths selected to send the uncompressed stream and/or the compressed stream could also be varied, depending on any or all of the above factors.

Figure 6:
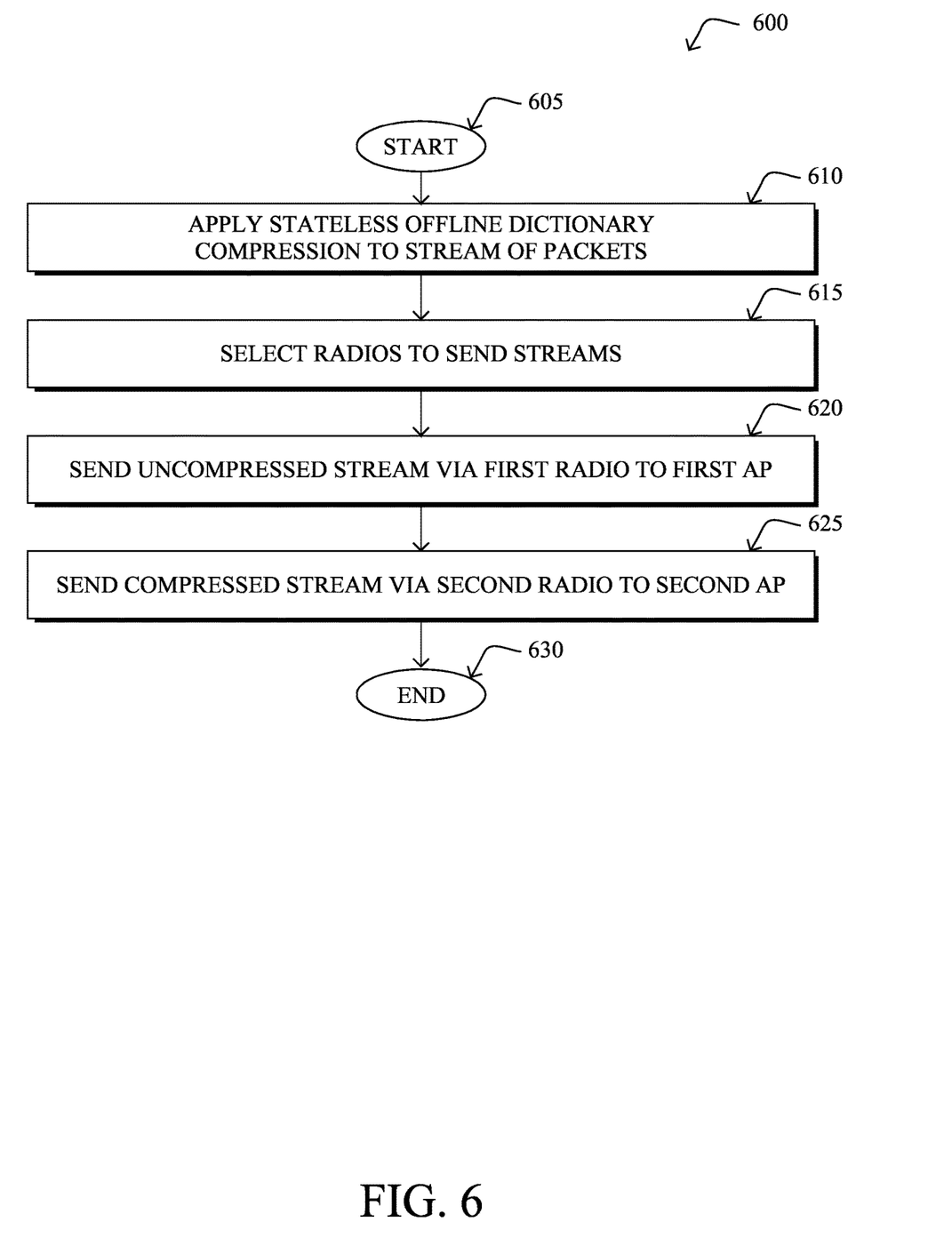
FIG. 6 illustrates an example simplified procedure for using stateless and offline dictionary compression for ultra-reliable and low-latency communications.

FIG. 6 illustrates an example simplified procedure for using stateless and offline dictionary compression for ultra-reliable and low-latency communications, in accordance with one or more embodiments described herein. The procedure 600 may start at step 605, and continues to step 610, where, as described in greater detail above, a mobile node in a network (e.g., a node comprising device 200) may apply stateless offline dictionary compression to an uncompressed stream of packets, to form a compressed stream of packets. In various embodiments, the mobile node may have a first radio and a second radio and the first radio of the mobile node communicates with a first access point of a wireless network and the second radio of the mobile node communicates with a second access point of the wireless network. In further embodiments, the mobile node also has one or more other radios in addition to the first radio and the second radio. In various embodiments, the mobile node may be a vehicle (e.g., a train, an automobile, a boat, etc.). In another embodiment, the vehicle may be an autonomous robot.

In various embodiments, mobile node may also determine that the uncompressed stream of packets should also be sent in compressed form, based in part on an application associated with the uncompressed stream of packets, a type of traffic associated with the uncompressed stream of packets, and/or expected performance metrics for the first wireless path and the second wireless path. For instance, the mobile node may decide to send the stream in compressed form when it comprises non-control traffic, such as audio, video, or the like.

At step 615, as detailed above, the mobile node may select the first radio to send the uncompressed stream of packets and the second radio to send the compressed stream of packets. In various embodiments, the mobile node selects the first radio to send the uncompressed stream of packets based on the first wireless path having a higher data rate than that of the second wireless path.

At step 620, the mobile node may send via the first radio, the uncompressed stream of packets to the first access point over a first wireless path. In some embodiments, the mobile node begins sending the uncompressed stream of packets prior to beginning to send the compressed stream of packets.

At step 625, as detailed above, the mobile node may send, via the second radio, the compressed stream of packets to the second access point over a second wireless path. In some embodiments, the mobile node also sends the compressed stream of packets via one or more of its other radios to one or more other access points of the wireless network and over one or more other wireless paths that are in addition to the first and second wireless paths. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for ultra-reliable communications in a wireless network through the use of multiple radios onboard a mobile node and path diversity between the node and multiple access points of the network, and in a manner that helps to reduce collisions. In some aspects, the mobile node may (dynamically) compress a stream of packets sent via its additional wireless links, to reduce their amount of airtime, while still sending the stream in uncompressed form via its primary wireless link. Thus, the proposed techniques are able to strike a tradeoff between airtime usage, which could lead to wireless collisions, and low-latency operations.

While there have been shown and described illustrative embodiments for ultra-reliable and low-latency communication using stateless and offline dictionary compression, it is to be understood that various other adaptations and modifications may be made within the intent and scope of the embodiments herein. For example, while the techniques herein are described with respect to certain types of wireless networks, the techniques herein are not limited as such and can be used in any other form of wireless network, as desired. Further, while certain protocols are used herein for illustrative purposes, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
    applying, by a mobile node having a first radio and a second radio, stateless offline dictionary compression to an uncompressed stream of packets, to form a compressed stream of packets, wherein the first radio of the mobile node communicates with a first access point of a wireless network and the second radio of the mobile node communicates with a second access point of the wireless network;
    selecting, by the mobile node, the first radio to send the uncompressed stream of packets and the second radio to send the compressed stream of packets;
    sending, by the mobile node and via the first radio, the uncompressed stream of packets to the first access point over a first wireless path; and
    sending, by the mobile node and via the second radio, the compressed stream of packets to the second access point over a second wireless path.

2. The method as in claim 1, wherein the mobile node selects the first radio to send the uncompressed stream of packets based on the first wireless path having a higher data rate than that of the second wireless path.

3. The method as in claim 1, wherein the mobile node has one or more other radios in addition to the first radio and the second radio, and wherein the method further comprises:
    sending, by the mobile node, the compressed stream of packets via the one or more other radios to one or more other access points of the wireless network over one or more other wireless paths that are in addition to the first wireless path and the second wireless path.

4. The method as in claim 1, further comprising:
    determining, by the mobile node, that the uncompressed stream of packets should also be sent in compressed form, based in part on an application associated with the uncompressed stream of packets.

5. The method as in claim 1, further comprising:
    determining, by the mobile node, that the uncompressed stream of packets should also be sent in compressed form, based in part on a type of traffic associated with the uncompressed stream of packets.

6. The method as in claim 5, wherein the type of traffic is non-control traffic.

7. The method as in claim 1, further comprising:
    determining, by the mobile node, that the uncompressed stream of packets should also be sent in compressed form, based in part on expected performance metrics for the first wireless path and the second wireless path.

8. The method as in claim 1, wherein the mobile node begins sending the uncompressed stream of packets prior to beginning to send the compressed stream of packets.

9. The method as in claim 1, wherein the mobile node is a vehicle.

10. The method as in claim 9, wherein the mobile node is an autonomous robot.

11. An apparatus, comprising:
- a first radio that communicates with a first access point of a wireless network over a first wireless path;
- a second radio that communicates with a second access point of the wireless network over a second wireless path;
- a processor coupled to the first radio and to the second radio that is configured to execute one or more processes; and
- a memory configured to store a process that is executable by the processor, the process when executed configured to:
  - apply stateless offline dictionary compression to an uncompressed stream of packets, to form a compressed stream of packets;
  - select the first radio to send the uncompressed stream of packets and the second radio to send the compressed stream of packets;
  - send, via the first radio, the uncompressed stream of packets to the first access point over the first wireless path; and
  - send, via the second radio, the compressed stream of packets to the second access point over the second wireless path.

12. The apparatus as in claim 11, wherein the apparatus selects the first radio to send the uncompressed stream of packets based on the first wireless path having a higher data rate than that of the second wireless path.

13. The apparatus as in claim 11, wherein the apparatus has one or more other radios in addition to the first radio and the second radio, and wherein the process when executed is further configured to:
- send the compressed stream of packets via the one or more other radios to one or more other access points of the wireless network over one or more other wireless paths that are in addition to the first wireless path and the second wireless path.

14. The apparatus as in claim 11, wherein the process when executed is further configured to:
- determine that the uncompressed stream of packets should also be sent in compressed form, based in part on an application associated with the uncompressed stream of packets.

15. The apparatus as in claim 11, wherein the process when executed is further configured to:
- determine that the uncompressed stream of packets should also be sent in compressed form, based in part on a type of traffic associated with the uncompressed stream of packets.

16. The apparatus as in claim 15, wherein the type of traffic is non-control traffic.

17. The apparatus as in claim 11, wherein the process when executed is further configured to:
- determine that the uncompressed stream of packets should also be sent in compressed form, based in part on expected performance metrics for the first wireless path and the second wireless path.

18. The apparatus as in claim 11, wherein the apparatus begins sending the uncompressed stream of packets prior to beginning to send the compressed stream of packets.

19. The apparatus as in claim 11, wherein the apparatus comprises a vehicle.

20. A tangible, non-transitory, computer-readable medium storing program instructions that cause a mobile node having a first radio and a second radio to execute a process comprising:
- applying, by the mobile node, stateless offline dictionary compression to an uncompressed stream of packets, to form a compressed stream of packets, wherein the first radio of the mobile node communicates with a first access point of a wireless network and the second radio of the mobile node communicates with a second access point of the wireless network;
- selecting, by the mobile node, the first radio to send the uncompressed stream of packets and the second radio to send the compressed stream of packets;
- sending, by the mobile node and via the first radio, the uncompressed stream of packets to the first access point over a first wireless path; and
- sending, by the mobile node and via the second radio, the compressed stream of packets to the second access point over a second wireless path.

* * * * *